(12) United States Patent
Xing et al.

(10) Patent No.: US 11,704,266 B2
(45) Date of Patent: Jul. 18, 2023

(54) CONTROL METHOD AND DEVICE FOR BIDIRECTIONAL COMMUNICATION

(71) Applicant: SHENZHEN LONTIUM SEMICONDUCTOR TECHNOLOGY CO., LTD., Guangdong (CN)

(72) Inventors: Xinrun Xing, Anhui (CN); Shenghui Hu, Anhui (CN); Shenghui Bao, Anhui (CN); Jin Su, Anhui (CN); Lei Li, Anhui (CN)

(73) Assignee: SHENZHEN LONTIUM SEMICONDUCTOR TECHNOLOGY CO., LTD., Shenzhen (CN)

( * ) Notice: Subject to any disclaimer, the term of this patent is extended or adjusted under 35 U.S.C. 154(b) by 166 days.

(21) Appl. No.: 17/459,081

(22) Filed: Aug. 27, 2021

(65) Prior Publication Data

US 2022/0391339 A1    Dec. 8, 2022

(30) Foreign Application Priority Data

Jun. 8, 2021    (CN) .......................... 202110639110.2

(51) Int. Cl.
| | |
|---|---|
| G06F 21/64 | (2013.01) |
| G06F 13/362 | (2006.01) |
| H04B 3/04 | (2006.01) |
| H04B 3/52 | (2006.01) |

(52) U.S. Cl.
CPC ............. *G06F 13/362* (2013.01); *H04B 3/04* (2013.01); *H04B 3/52* (2013.01)

(58) Field of Classification Search
None
See application file for complete search history.

(56) References Cited

U.S. PATENT DOCUMENTS

| | | | | |
|---|---|---|---|---|
| 6,081,527 A | * | 6/2000 | Chappel .................... | H04L 7/02 375/220 |
| 6,697,897 B1 | * | 2/2004 | Friel ...................... | H04L 5/1423 709/209 |
| 9,798,660 B1 | * | 10/2017 | Susai ..................... | G06F 3/0638 |
| 10,313,197 B1 | * | 6/2019 | Stamatakis ......... | H04W 40/248 |

(Continued)

*Primary Examiner* — Hyun Nam
(74) *Attorney, Agent, or Firm* — Merchant & Gould P.C.

(57) ABSTRACT

A control method and device for bidirectional communication are provided. A handshake between the master and slave communication units is realized by sending the training sequence. The master communication unit is controlled to obtain control information from the ECU. The control information is packaged into the custom package, and the custom package is encoded. The master communication unit is controlled to send the custom package to the slave communication unit. The slave communication unit decodes, verifies and corrects the custom package. The slave communication unit feeds back the correct message to the master communication unit if the custom package is verified to be correct, else feeds back the error message to the master communication unit. The master communication unit resends the custom package to the slave communication unit if it receives the error information or does not receive any feedback information within the preset time period.

8 Claims, 5 Drawing Sheets

(56) References Cited

U.S. PATENT DOCUMENTS

| | | | |
|---|---|---|---|
| 2007/0268990 A1* | 11/2007 | Warren | H04L 7/0337 |
| | | | 375/E1.003 |
| 2009/0141789 A1* | 6/2009 | Warren | H04L 1/1664 |
| | | | 375/354 |
| 2017/0171081 A1* | 6/2017 | Mishra | H04W 28/0221 |
| 2017/0286356 A1* | 10/2017 | Levy | G06F 13/4286 |
| 2020/0059430 A1* | 2/2020 | Trautmann | H04L 43/16 |
| 2021/0327420 A1* | 10/2021 | Aher | G06N 3/049 |
| 2022/0224782 A1* | 7/2022 | Wu | H04L 12/66 |
| 2022/0391339 A1* | 12/2022 | Xing | H04B 3/52 |
| 2022/0400011 A1* | 12/2022 | Moon | H04L 63/061 |
| 2023/0036806 A1* | 2/2023 | Moon | H04L 63/029 |
| 2023/0072792 A1* | 3/2023 | Limonad | H04W 4/80 |
| 2023/0075058 A1* | 3/2023 | Gibbs | A63B 24/0062 |
| 2023/0090837 A1* | 3/2023 | Teo | H04L 67/025 |

* cited by examiner

CONTROL METHOD AND DEVICE FOR BIDIRECTIONAL COMMUNICATION

The present application claims priority to Chinese Patent Application No. 202110639110.2, titled "CONTROL METHOD AND DEVICE FOR BIDIRECTIONAL COMMUNICATION", filed on Jun. 8, 2021 with the China National Intellectual Property Administration, which is incorporated herein by reference in its entirety.

FIELD

The present disclosure relates to the field of vehicle technology, and in particular to a control method and device for bidirectional communication.

BACKGROUND

In a data communication system of a vehicle, generally a twisted pair cable or a coaxial cable is used for communication to reduce the complexity and cost of the system. Since there is only a data path and no clock path in the twisted pair cable and the coaxial cable, long-distance communication is difficult to be implemented.

SUMMARY

In view of this, a control method and device for bidirectional communication are provided according to embodiments of the present disclosure, to realize long-distance communication based on a twisted pair cable or a coaxial cable.

To achieve the above objective, the present disclosure provides following technical solutions.

A control method for bidirectional communication, applied to a single-channel data link, the single-channel data link including a master communication unit and a slave communication unit connected to the master communication unit through a twisted pair cable or a coaxial cable, wherein the control method for bidirectional communication includes:

performing a handshake between the master communication unit and the slave communication unit by sending a training sequence, determining data stability and a data transmission rate by the handshake, to make the master communication unit and the slave communication unit in a control signal transmission state;

controlling the master communication unit to obtain control information from an electronic control unit (ECU) and to package the control information into a custom package;

controlling the master communication unit to send the custom package to the slave communication unit, wherein the slave communication unit verifies the custom package received from the master communication unit, feeds back a correct message to the master communication unit in a case that the custom package is verified to be correct, and feeds back an error message to the master communication unit in a case that the custom package is verified to be incorrect; and reseeding the custom package to the slave communication unit, in a case that the error message is received by the master communication unit or no feedback message is received by the master communication unit within a preset time period.

Optionally, the performing a handshake between the master communication unit and the slave communication unit by sending a training sequence, determining data stability and a data transmission rate by the handshake, to make the master communication unit and the slave communication unit in a control signal transmission state includes:

controlling the master communication unit to send a training sequence A to the slave communication unit:

controlling the slave communication unit to determine the data stability and obtain the data transmission rate according to the training sequence A, to enter the control signal transmission state, and to send a training sequence B to the master communication unit; and controlling the mater communication unit to receive the training sequence B, and to enter the control signal transmission state in response to a reception of the training sequence B.

Optionally, the control method for bidirectional communication further includes:

executing, by the master communication unit, a new transmission operation of the control information when needed, in response to a reception of the correct message.

Optionally, the control method for bidirectional communication further includes:

performing, by the slave communication unit, a write operation if the control information is write information; and performing, by the slave communication unit, a read operation if the control information is read information, and feeding back to the master communication unit information which is read out.

A control device for bidirectional communication, applied to a single-channel data link, the single-channel data link including a master communication unit and a slave communication unit connected to the master communication unit through a twisted pair cable or a coaxial cable, wherein the control device for bidirectional communication includes: a handshake module, an information acquisition module, a first sending module, and a second sending module; wherein:

the handshake module is configured to perform a handshake between the master communication unit and the slave communication unit by sending a training sequence, determine data stability and a data transmission rate by the handshake, to make the master communication unit and the slave communication unit in a control signal transmission state;

the information acquisition module is configured to control the master communication unit to obtain control information from an electronic control unit (ECU) and package the control information into a custom package;

the first sending module is configured to control the master communication unit to send the custom package to the slave communication unit, wherein the slave communication unit verifies the custom package received from the master communication unit; feeds back a correct message to the master communication unit in a case that the custom package is verified to be correct; and feeds back an error message to the master communication unit in a case that the custom package is verified to be incorrect; and the second sending module is configured to resend the custom package to the slave communication unit, in a case that the error message is received by the master communication unit or no feedback message is received by the master communication unit within a preset time period.

Optionally the handshake module includes:

an information sending unit configured to control the master communication unit to send a training sequence A to the slave communication unit;

a first control unit configured to control the slave communication unit to determine the data stability and obtain the data transmission rate according to the training sequence A, to enter the control signal transmission state, and to send a training sequence B to the master communication unit; and a second control unit configured to control the mater communication unit to receive the training sequence B, and to enter the control signal transmission state in response to a reception of the training sequence B.

Optionally, the control device for bidirectional communication further includes:

a repeated execution module configured to execute a new transmission operation of the control information when needed, in a case that the correct message is received by the master communication unit.

Optionally a write operation is performed by the slave communication unit if the control information is write information; and a read operation is performed by the slave communication unit if the control information is read information, and information which is read out is fed back to the master communication unit.

In the control method and device for bidirectional communication provided according to embodiments of the present disclosure, the handshake between the master communication unit and the slave communication unit is realized by sending the training sequence. The master communication unit is controlled to obtain the control information from the ECU. The control information is packaged into the custom package, and the custom package is encoded. The master communication unit is controlled to send the custom package to the slave communication unit. The slave communication unit decodes, verifies and corrects the received custom package. The slave communication unit feeds back the correct message to the master communication unit if the custom package is verified to be correct, and feeds back the error message to the master communication unit if the custom package is verified to be incorrect. The master communication unit resends the custom package to the slave communication unit if it receives the error information or does not receive any feedback information within the preset time period. Through the coordination of DC balanced encoding, handshake, error correction and error retransmission mechanisms, effective transmission of information can be guaranteed even if communication errors occur, thereby realizing long-distance communication in the twisted pair cable or the coaxial cable without the clock channel.

BRIEF DESCRIPTION OF THE DRAWINGS

In order to clearly describe the technical solutions in the embodiments of the present disclosure or conventional technology, drawings to be used in the description of the embodiments and conventional technology are briefly described hereinafter. It is apparent that the drawings described below show merely some embodiments of the present disclosure. Those skilled in the art may obtain other drawings according to the provided drawings without any creative effort.

DETAILED DESCRIPTION OF EMBODIMENTS

The technical solutions in the embodiments of the present disclosure will be described clearly and completely hereinafter in conjunction with the drawings in the embodiments of the present disclosure. Apparently, the described embodiments are only a part of the embodiments of the present disclosure, rather than all embodiments. Based on the embodiments in the present disclosure, all of other embodiments, made by the person skilled in the art without any creative efforts, fall into the scope of protection of the present disclosure.

First Embodiment

Figure 1:
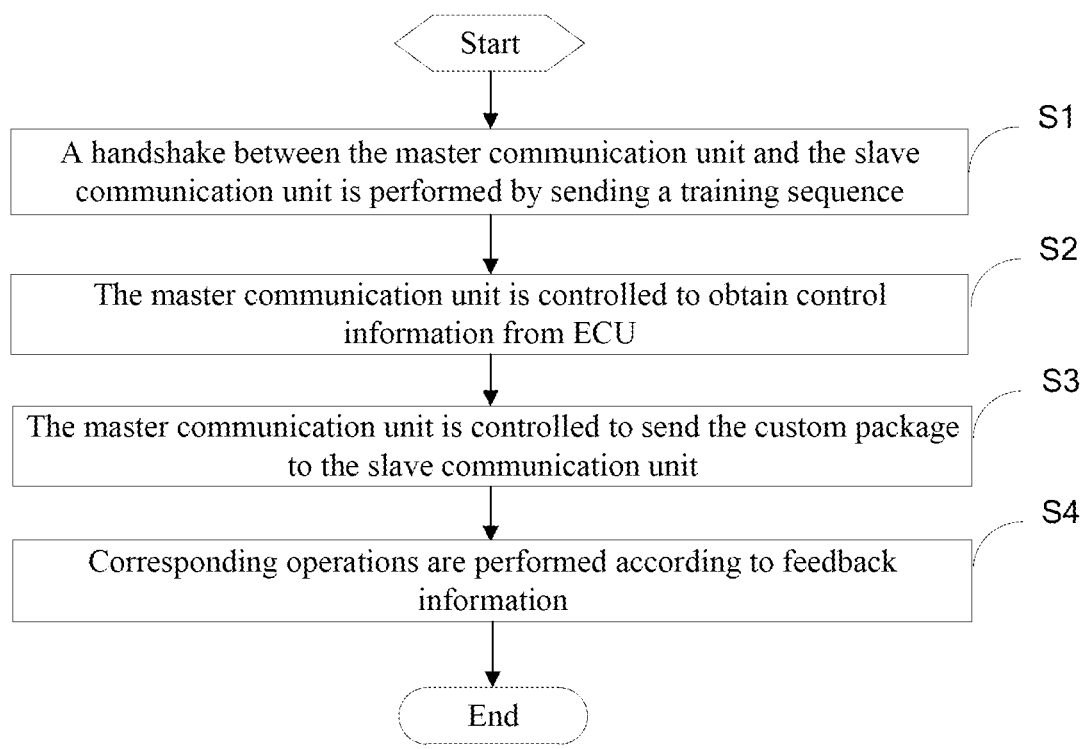
FIG. 1 is a flowchart of a control method for bidirectional communication according to an embodiment of the present disclosure.

Reference is made to FIG. 1, which is a flowchart of a control method for bidirectional communication according to an embodiment of the present disclosure.

Figure 2:
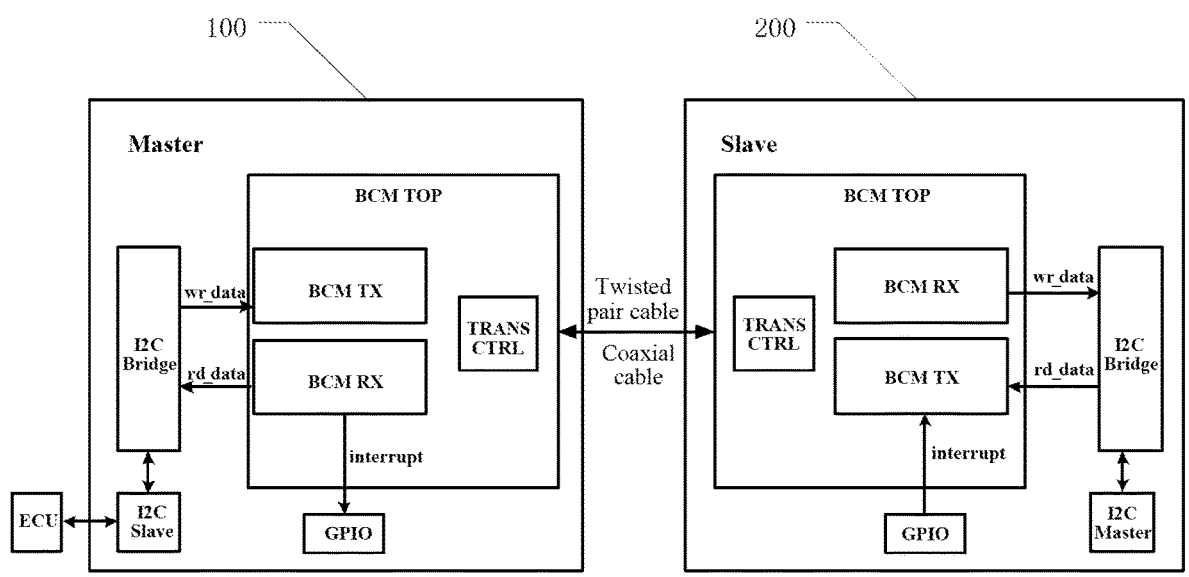
FIG. 2 is a schematic diagram of a single-channel data link according to an embodiment of the present disclosure.

A control method for bidirectional communication is provided according to an embodiment of the present disclosure, which is applied to a single-channel data link. The single-channel data link includes a master communication unit 100 and a slave communication unit 200, as shown in FIG. 2. The master communication unit 100 and the slave communication unit 200 are connected to each other through a twisted pair cable or a coaxial cable. Each of the two communication units is provided with an RX end and a TX end, to receive and transmit information.

As shown in FIG. 1, the control method for bidirectional communication includes following steps S1 to S4.

In step S1, a handshake between the master communication unit and the slave communication unit is performed by sending a training sequence.

If two communication units need to be communicated with each other, a handshake between the master communication unit and the slave communication unit can be realized through the training sequence, to make both the master communication unit and the slave communication unit in a control signal transmission state. The training sequence includes a training sequence A and a training sequence B. A specific handshake process is described as follows.

The master communication unit is controlled to send the training sequence A to the slave communication unit.

The slave communication unit is controlled to: process the training sequence A received to determine data stability and analyze a data transmission rate, to feed back the training sequence B to the master communication unit, and to enter the control signal transmission state.

In response to a reception of the training sequence B, the master communication unit enters the control signal transmission state.

After the master communication unit and the slave communication unit is in the control signal transmission state, the master communication unit can be enabled through a register, to resend the training sequence A, and repeat the above handshake process.

In step S2, the master communication unit is controlled to obtain control information from an electronic control unit (ECU).

After the handshake between the two communication units is completed, when the control information needs to be sent to the slave communication unit, the master communication unit is controlled to obtain from the ECU the control information to be transmitted, to package the control information into a custom package.

In step S3, the master communication unit is controlled to send a custom package to the slave communication unit.

After packaging the control information, the master communication unit is controlled to perform a parallel-serial conversion on the custom package, and to send the custom package after the parallel-serial conversion to the slave communication unit through the twisted pair cable or the coaxial cable for connecting the two communication units. After receiving serial data, the slave communication unit performs a serial-parallel conversion and an unpacking process on the serial data, to obtain effective information such as an address, a read and write command, a data; and perform a verification based on a cyclical redundancy check (CRC).

If it is verified that the received information is correct, the slave communication unit feeds back a correct message to the master communication unit. If it is verified that the received information is incorrect, the slave communication unit feeds back an error message to the master communication unit.

In step S4, corresponding operations are performed according to feedback information.

If the master communication unit receives the error message or does not receive any feedback information within a preset time period, that is, neither the error message nor the correct message is received by the master communication unit, it is determined that the master communication unit has failed to send the custom package. In this case, the master communication unit resends the custom packet and waits for the feedback information from the slave communication unit.

In the control method for bidirectional communication provided according to the embodiment of the present disclosure, the handshake between the master communication unit and the slave communication unit is realized by sending the training sequence. The master communication unit is controlled to obtain the control information from the ECU. The control information is packaged into the custom package, and the custom package is encoded. The master communication unit is controlled to send the custom package to the slave communication unit. The slave communication unit decodes, verifies and corrects the received custom package. The slave communication unit feeds back the correct message to the master communication unit if the custom package is verified to be correct, and feeds back the error message to the master communication unit if the custom package is verified to be incorrect. The master communication unit resends the custom package to the slave communication unit if it receives the error information or does not receive any feedback information within the preset time period. Through the coordination of DC balanced encoding, handshake, error correction and error retransmission mechanisms, effective transmission of information can be guaranteed even if communication errors occur, thereby realizing long-distance communication in the twisted pair cable or the coaxial cable without the clock channels.

Figure 3:
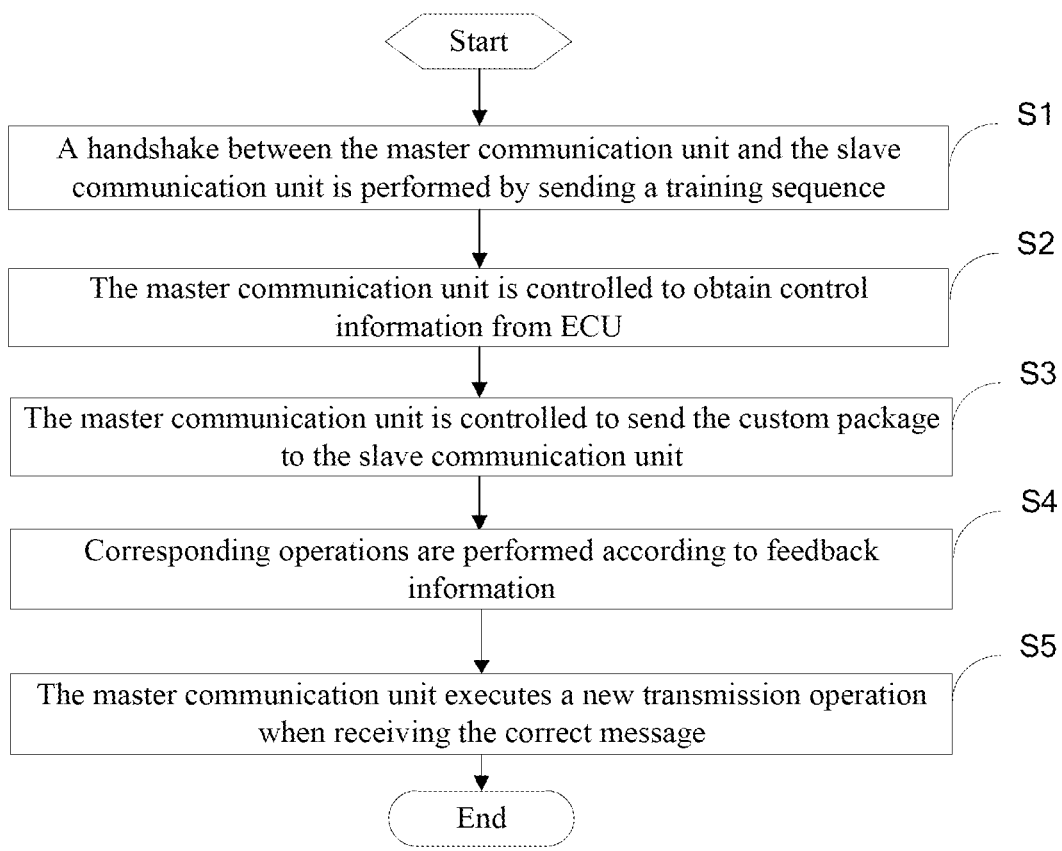
FIG. 3 is a flowchart of a control method for bidirectional communication according to another embodiment of the present disclosure.

In one embodiment of the present disclosure, the control method for bidirectional communication further includes step S5, as shown in FIG. 3.

In step S5, the master communication unit executes a new transmission operation when receiving the correct message.

The slave communication unit receives the information and verifies that the received information is correct, and then the correct message is sent by the slave communication unit. The master communication unit can execute a new transmission operation of the control information in response to the correct message, therefore realizing continuous information transmission.

In the embodiment, if the control information is write information, a write operation is performed by the slave communication unit. If the control information is read information, a read operation is performed by the slave communication unit, and the information which is read out is fed back to the master communication unit.

Second Embodiment

Figure 4:
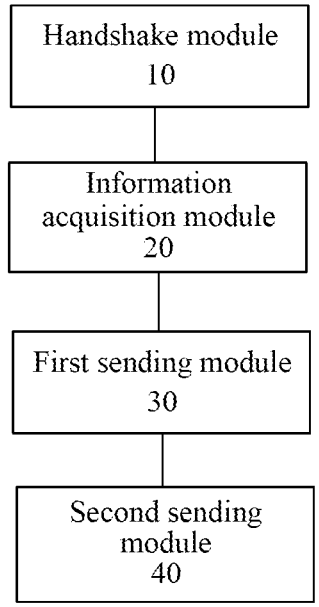
FIG. 4 is a block diagram of a control device for bidirectional communication according to an embodiment of the present disclosure.

Reference is made to FIG. 4, which is a block diagram of a control device for bidirectional communication according to an embodiment of the present disclosure.

A control device for bidirectional communication is provided according to an embodiment of the present disclosure, which is applied to a single-channel data link. The single-channel data link includes a master communication unit 100 and a slave communication unit 200, as shown in FIG. 2. The master communication unit 100 and the slave communication unit 200 are connected to each other through a twisted pair cable or a coaxial cable. Each of the two communication units is provided with an RX end and a TX end, to send and receive information.

As shown in FIG. 4, the control device for bidirectional communication includes: a handshake module 10, an information acquisition module 20, a first sending module 30, and a second sending module 40.

The handshake module is configured to perform a handshake between the master communication unit and the slave communication unit by sending a training sequence.

Figure 5:
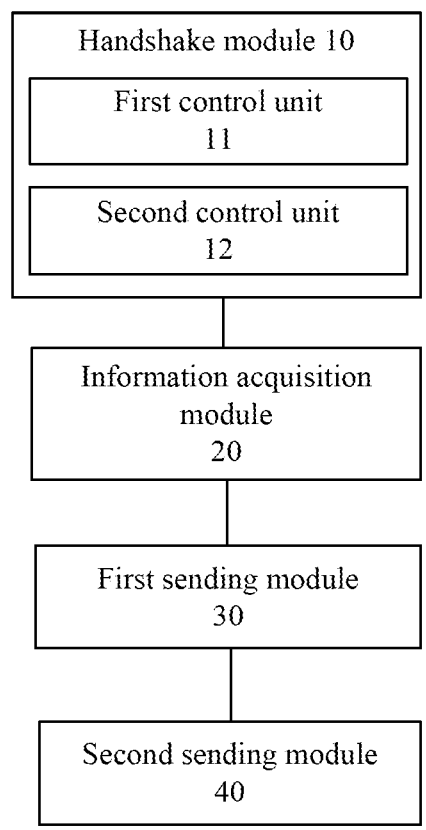
FIG. 5 is a block diagram of a control device for bidirectional communication according to another embodiment of the present disclosure.

If two communication units need to be communicated with each other, the handshake between the master communication unit and the slave communication unit can be realized through the training sequence, to make both the master communication unit and the slave communication unit in a control signal transmission state. The training sequence includes a training sequence A and a training sequence B. As shown in FIG. 5, the handshake module includes an information sending unit 11, a first control unit 12, and a second control unit 13.

The information sending unit is configured to control the master communication unit to send the training sequence A to the slave communication unit.

The first control unit is configured to control the slave communication unit to process the training sequence A received to determine data stability and analyze a data transmission rate, to feed back the training sequence B to the master communication unit, and to enter the control signal transmission state.

The second control unit is configured to control the master communication unit to receive the training sequence B, and to enter the control signal transmission state, in response to a reception of the training sequence B.

After the master communication unit and the slave communication unit is in the control signal transmission state, the master communication unit can be enabled through a register, to resends the training sequence A, and repeat the above handshake process.

The information acquisition module is configured to control the master communication unit to obtain control information from an electronic control unit (ECU).

After the handshake between the two communication units is completed, when the control information needs to be sent to the slave communication unit, the master communication unit is controlled to obtain from the ECU the control information to be transmitted, to package the control information into a custom package.

The first sending module is configured to control the master communication unit to send a custom package to the slave communication unit.

After packaging the control information, the master communication unit is controlled to perform a parallel-serial conversion on the custom package, and to send the custom package after the parallel-serial conversion to the slave communication unit through the twisted pair cable or the coaxial cable for connecting the two communication units. After receiving serial data, the slave communication unit performs a serial-parallel conversion and an unpacking process on the serial data, to obtain effective information such as an address, a read and write command, a data; and perform a verification based on a cyclical redundancy check (CRC).

If it is verified that the received information is correct, the slave communication unit feeds back a correct message to the master communication unit. If it is verified that the received information is incorrect, the slave communication unit feeds back an error message to the master communication unit.

The second sending module is configured to perform corresponding operations based on feedback information.

If the master communication unit receives the error message or does not receive any feedback information within a preset time period, that is, neither the error message nor the correct message is received by the master communication unit, it is determined that the master communication unit has failed to send the custom package. In this case, the master communication unit resends the custom packet and waits for the feedback information from the slave communication unit.

In the control device for bidirectional communication provided according to the embodiment of the present disclosure, the handshake between the master communication unit and the slave communication unit is realized by sending the training sequence. The master communication unit is controlled to obtain the control information from the ECU. The control information is packaged into the custom package, and the custom package is encoded. The master communication unit is controlled to send the custom package to the slave communication unit. The slave communication unit decodes, verifies and corrects the received custom package. The slave communication unit feeds back the correct message to the master communication unit if the custom package is verified to be correct, and feeds back the error message to the master communication unit if the custom package is verified to be incorrect. The master communication unit resends the custom package to the slave communication unit if it receives the error information or does not receive any feedback information within the preset time period. Through the coordination of DC balanced encoding, handshake, error correction and error retransmission mechanisms, effective transmission of information can be guaranteed even if communication errors occur, thereby realizing long-distance communication in the twisted pair cable or the coaxial cable without the clock channels.

Figure 6:
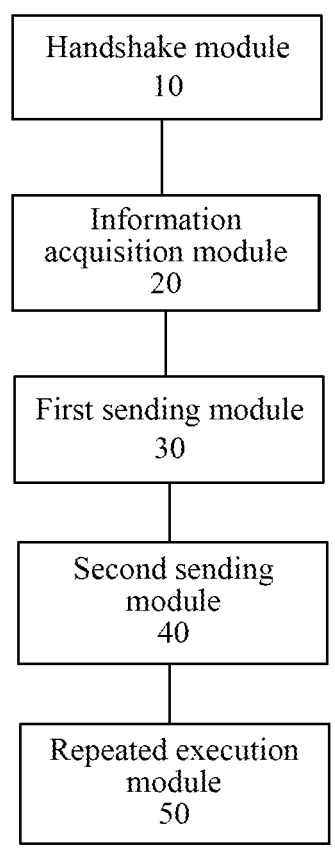
FIG. 6 is a block diagram of a control device for bidirectional communication according to another embodiment of the present disclosure.

In one embodiment of the present disclosure, the control device for bidirectional communication further includes a repeated execution module 50 as shown in FIG. 6.

The repeated execution module is configured to execute a new transmission operation when the master communication unit receives the correct message.

The slave communication unit receives the information and verifies that the received information is correct, and the correct message is sent by the slave communication unit. The master communication unit can execute a new transmission operation of the control information in response to the correct message, therefore realizing continuous information transmission.

In the embodiment, if the control information is write information, a write operation is performed by the slave communication unit. If the control information is read information, a read operation is performed by the slave communication unit, and the information which is read out is fed back to the master communication unit.

The above embodiments in the present disclosure are described in a progressive manner. Each of the embodiments is mainly focused on describing its differences from other embodiments, and references may be made among these embodiments with respect to the same or similar portions among these embodiments.

Those skilled in the art should understand that the embodiments of the present disclosure may be provided as methods, devices, or computer program products. Therefore, the embodiments of the present disclosure may adopt the form of a complete hardware embodiment, a complete software embodiment, or an embodiment combining software and hardware. Moreover, the embodiments of the present disclosure may adopt the form of computer program products implemented on one or more computer-readable storage media (including but not limited to disk storage, a CD-ROM, an optical storage, etc.) containing computer-readable program codes.

The embodiments of the present disclosure are described with reference to the flowcharts and/or block diagrams of the methods, terminal devices (systems), and computer program products according to the embodiments of the present disclosure. It should be understood that each process and/or block in the flowchart and/or block diagram, and the combination of processes and/or blocks in the flowchart and/or block diagram can be realized by computer program instructions. These computer program instructions can be provided to the processors of general-purpose computers, special-purpose computers, embedded processors, or other programmable data processing terminal equipment to generate a machine, so that instructions executed by the computer or other programmable data processing terminal equipment can generate a device for realizing the functions specified in a process or multiple processes in the flowchart and/or a block or multiple blocks in the block diagram.

These computer program instructions can also be stored in a computer-readable memory that can guide a computer or other programmable data processing terminal equipment to work in a specific manner, so that the instructions stored in the computer-readable memory produce an article of manufacture including the instruction device. The instruction device implements the functions specified in one process or multiple processes in the flowchart and/or one block or multiple blocks in the block diagram.

These computer program instructions can also be loaded on a computer or other programmable data processing terminal equipment, so that a series of operation steps are executed on the computer or other programmable terminal equipment to produce computer-implemented processing, so that the instructions executed on the computer or other programmable terminal equipment provide steps for implementing functions specified in a process or multiple processes in the flowchart and/or a block or multiple blocks in the block diagram.

Although the preferred embodiments of the present disclosure have been described, those skilled in the art can make additional changes and modifications to these embodiments once they learn the basic creative concept. Therefore, the appended claims are intended to be interpreted as including the preferred embodiments and all changes and modifications falling within the scope of the embodiments of the present disclosure.

It should be further noted that, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

The embodiments of the present disclosure are described in detail in the above content. The present disclosure is described by specific embodiments in the specification. The above description for embodiments is only for helping to understand the method and the principle concept of the present disclosure. For those skilled in the art, modification can be made to the specific embodiments and the application scopes based on the concept of the present disclosure, as above, the specification should not be understood to limit the present disclosure.

The invention claimed is:

1. A control method for bidirectional communication, applied to a single-channel data link, the single-channel data link comprising a master communication unit and a slave communication unit connected to the master communication unit through a twisted pair cable or a coaxial cable, wherein the control method for bidirectional communication comprises:
    performing a handshake between the master communication unit and the slave communication unit by sending a training sequence, determining data stability and a data transmission rate by the handshake, to make the master communication unit and the slave communication unit in a control signal transmission state;
    controlling the master communication unit to obtain control information from an electronic control unit (ECU), and to package the control information into a custom package;
    controlling the master communication unit to send the custom package to the slave communication unit, wherein the slave communication unit verifies the custom package received from the master communication unit, feeds back a correct message to the master communication unit in a case that the custom package is verified to be correct, and feeds back an error message to the master communication unit in a case that the custom package is verified to be incorrect; and
    resending the custom package to the slave communication unit, in a case that the error message is received by the master communication unit or no feedback message is received by the master communication unit within a preset time period.

2. The control method for bidirectional communication according to claim 1, wherein the performing a handshake between the master communication unit and the slave communication unit by sending a training sequence, determining data stability and a data transmission rate by the handshake, to make the master communication unit and the slave communication unit in a control signal transmission state comprises:
    controlling the master communication unit to send a training sequence A to the slave communication unit;
    controlling the slave communication unit to determine the data stability and obtain the data transmission rate according to the training sequence A, to enter the control signal transmission state, and to send a training sequence B to the master communication unit; and
    controlling the mater communication unit to receive the training sequence B, and to enter the control signal transmission state in response to a reception of the training sequence B.

3. The control method for bidirectional communication according to claim 1, further comprising:
    executing, by the master communication unit, a new transmission operation of the control information when needed, in response to a reception of the correct message.

4. The control method for bidirectional communication according to claim 1, further comprising:
    performing, by the slave communication unit, a write operation if the control information is write information; and
    performing, by the slave communication unit, a read operation if the control information is read information, and feeding back to the master communication unit information which is read out.

5. A control device for bidirectional communication, applied to a single-channel data link, the single-channel data link comprising a master communication unit and a slave communication unit connected to the master communication unit through a twisted pair cable or a coaxial cable, wherein the control device for bidirectional communication comprises:
    a handshake module configured to perform a handshake between the master communication unit and the slave communication unit by sending a training sequence; and determine data stability and a data transmission rate by the handshake, to make the master communication unit and the slave communication unit in a control signal transmission state;
    an information acquisition module configured to control the master communication unit to obtain control information from an electronic control unit (ECU), and to package the control information into a custom package;
    a first sending module configured to control the master communication unit to send the custom package to the slave communication unit, wherein the slave communication unit verifies the custom package received from the master communication unit; feeds back a correct message to the master communication unit in a case that the custom package is verified to be correct; and feeds back an error message to the master communication unit in a case that the custom package is verified to be incorrect; and
    a second sending module configured to resend the custom package to the slave communication unit in a case that the error message is received by the master communication unit or no feedback message is received by the master communication unit within a preset time period.

6. The control device for bidirectional communication according to claim 5, wherein the handshake module comprises:
- an information sending unit configured to control the master communication unit to send a training sequence A to the slave communication unit;
- a first control unit configured to control the slave communication unit to determine the data stability and obtain the data transmission rate according to the training sequence A, to enter the control signal transmission state, and to send a training sequence B to the master communication unit; and
- a second control unit configured to control the mater communication unit to receive the training sequence B, and to enter the control signal transmission state in response to a reception of the training sequence B.

7. The control device for bidirectional communication according to claim 5, further comprising:
- a repeated execution module configured to execute a new transmission operation of the control information when needed, in a case that the correct message is received by the master communication unit.

8. The control device for bidirectional communication according to claim 5, wherein a write operation is performed by the slave communication unit if the control information is write information; and a read operation is performed by the slave communication unit if the control information is read information, and information which is read out is fed back to the master communication unit.

* * * * *